US 11,371,234 B2

United States Patent
Deju et al.

(10) Patent No.: US 11,371,234 B2
(45) Date of Patent: Jun. 28, 2022

(54) CIRCULAR PARALLEL PLATE GRIT REMOVER

(71) Applicant: Smith & Loveless Inc., Lenexa, KS (US)

(72) Inventors: Lilunnahar Deju, Overland Park, KS (US); John K. Kelly, Overland Park, KS (US); Alexander P. Zuzelski, Lenexa, KS (US); Rodney S. Mrkvicka, Leawood, KS (US)

(73) Assignee: Smith & Loveless Inc., Lenexa, KS (US)

( * ) Notice: Subject to any disclaimer, the term of this patent is extended or adjusted under 35 U.S.C. 154(b) by 0 days.

(21) Appl. No.: 17/223,149

(22) Filed: Apr. 6, 2021

(65) Prior Publication Data

US 2021/0363745 A1 Nov. 25, 2021

Related U.S. Application Data

(60) Provisional application No. 63/028,343, filed on May 21, 2020.

(51) Int. Cl.
*B01D 21/02* (2006.01)
*E03F 5/14* (2006.01)
(Continued)

(52) U.S. Cl.
CPC ............ *E03F 5/14* (2013.01); *B01D 21/0042* (2013.01); *B01D 21/0045* (2013.01);
(Continued)

(58) Field of Classification Search
CPC ............ B01D 21/0042; B01D 21/0045; B01D 21/0087; B01D 21/2411; B01D 21/2438; B01D 21/2472
(Continued)

(56) References Cited

U.S. PATENT DOCUMENTS

| 584,406 A | * | 6/1897 | Rowan | B01D 29/56 |
| | | | | 210/532.1 |
| 1,030,271 A | * | 6/1912 | Arbuckle | B01D 21/0039 |
| | | | | 210/521 |

(Continued)

FOREIGN PATENT DOCUMENTS

| EP | 671197 | * 7/1994 |
| GB | 444541 A | 3/1936 |

OTHER PUBLICATIONS

International Search Report and Written Opinion dated Jun. 11, 2021.

*Primary Examiner* — Christopher Upton
(74) *Attorney, Agent, or Firm* — Wood, Phillips, Katz, Clark & Mortimer

(57) ABSTRACT

A grit removal unit including a cylindrical grit removal chamber above a grit storage chamber, with an opening to the grit storage chamber through the grit removal chamber bottom. At least one layer plate is an inverted truncated cone around the center axis which is spaced from the grit removal chamber vertical wall to allow fluid flow therebetween. Concentric inverted truncated cone lamella plates are supported in the grit removal chamber above the layered plates, with the lamella plates radially spaced from one another relative to the center axis. An influent opening in the grit removal chamber vertical wall below the layered plates allows fluid and grit into the grit removal chamber, and an effluent opening in the grit removal chamber vertical wall above the lamella plates allows fluid to exit the grit removal chamber.

38 Claims, 10 Drawing Sheets

(51) Int. Cl.
 *B01D 21/00* (2006.01)
 *B01D 21/24* (2006.01)

(52) U.S. Cl.
 CPC ...... *B01D 21/0087* (2013.01); *B01D 21/2411* (2013.01); *B01D 21/2438* (2013.01); *B01D 21/2472* (2013.01)

(58) Field of Classification Search
 USPC ............... 210/519, 521, 532.1, 540, 802
 See application file for complete search history.

(56) References Cited

U.S. PATENT DOCUMENTS

| | | | | |
|---|---|---|---|---|
| 1,177,849 A * | 4/1916 | Kalb | ............ | B01D 29/0027 |
| | | | | 210/519 |
| 1,274,814 A * | 8/1918 | Sundness | ............ | B04C 5/02 |
| | | | | 210/521 |
| 1,682,256 A * | 8/1928 | Schwarz | ............ | B01D 21/2416 |
| | | | | 210/540 |
| 1,701,068 A * | 2/1929 | Flowers | ............ | B01D 21/0045 |
| | | | | 210/208 |
| 2,081,632 A * | 5/1937 | McBain | ............ | C10M 175/00 |
| | | | | 210/521 |
| 2,193,706 A * | 3/1940 | Attwood | ............ | B01D 21/2411 |
| | | | | 210/802 |
| 3,941,698 A | 3/1976 | Weis | | |
| 4,107,038 A | 8/1978 | Weis | | |
| 4,519,907 A | 5/1985 | Rooney | | |
| 4,767,532 A | 8/1988 | Weis | | |
| 4,865,753 A | 9/1989 | Meurer | | |
| 6,811,697 B2 | 11/2004 | Davis et al. | | |
| 6,881,350 B2 | 4/2005 | Wilson | | |
| 6,921,489 B2 | 7/2005 | Albertson | | |
| 6,960,304 B1 | 11/2005 | Brown et al. | | |
| 7,971,732 B2 | 7/2011 | Weis et al. | | |
| 8,342,338 B2 * | 1/2013 | Andoh | ............ | B01D 21/0045 |
| | | | | 210/519 |
| 8,906,233 B2 | 12/2014 | Messick et al. | | |
| 9,334,178 B2 | 5/2016 | Noonan et al. | | |
| 9,932,731 B2 | 4/2018 | Noonan et al. | | |
| 2010/0206166 A1 | 8/2010 | Tuomas | | |
| 2021/0023478 A1 * | 1/2021 | Werner | ............ | B01D 21/0087 |

* cited by examiner

CIRCULAR PARALLEL PLATE GRIT REMOVER

CROSS-REFERENCE TO RELATED APPLICATIONS

This application claims priority of Provisional Ser. No. 63/028,343, filed May 21, 2020, the disclosure of which is hereby incorporated by reference in its entirety.

FEDERALLY SPONSORED RESEARCH OR DEVELOPMENT

Not Applicable.

MICROFICHE/COPYRIGHT REFERENCE

Not Applicable.

FIELD OF THE INVENTION

The present invention relates to a grit remover, collector and/or trap for selectively removing sand and grit from a flowing stream of fluid.

BACKGROUND OF THE INVENTION

Grit is one of the most unpredictable and difficult materials a sewage treatment plant must handle. Grit can be defined as the heavy mineral matter present in sewage. It is principally made up of sand, gravel, and inorganic material with a specific gravity of 2.65 which reaches a sewage disposal plant. It is desirous to remove this material as it cannot be treated, reduced in size, or eliminated by treatment methods. R presents a problem to waste treatment as it is hard and abrasive. It wears pumps and other mechanical devices. It is heavy and accumulates in clarifiers, treatment basins, digesters, etc., where a must sometimes be removed manually.

Grit removal devices of various designs have been proposed to remove grit from a flowing stream of water. For example, inclined flat plate separators known as lamella units have been used in various types of equipment for separating solids from liquid and in other separation applications. See, e.g., U.S. Pat. Nos. 6,921,489 and 6,960,304.

Other devices remove grit from the waste water as the water flows from an influent channel around a round chamber creating a circular flow stream which causes the grit to settle near the bottom center of the round chamber before exits through an effluent channel. The grit in the injected liquid is removed from the liquid stream and collected in the storage chamber for relatively easy removal (see, e.g., U.S. Pat. Nos. 6,811,697 and 3,941,698, 4,107,038, 4,519,907, 6,811,697, 6,881,350, 8,906,233 and 9,334,178).

U.S. Pat. No. 3,941,698 includes an upper settling chamber and a lower grit storage chamber. The settling chamber, being of large diameter, communicates with the storage chamber through a relatively small opening in a substantially flat transition surface therebetween. Rotating paddies positioned within the settling chamber, a short distance above the transition surface, can enhance the natural rotational flow of liquid entering the settling chamber adjacent the outer periphery to rotate about the chamber as a forced vortex resulting in an upward spiral flow which urges the settled particles across the transition surface towards the opening. The heavier settled particles fall through the opening into the storage chamber and the lighter organic particles rise in the spiral flow. The contents in the storage chamber are lightly air scoured prior to removal to cause any organics therein to be lifted out of the storage chamber and returned to the settling chamber.

A similar type of grit removal device is disclosed in U.S. Pat. No. 4,107,038, in which a ramp is in communication with the flume portion of the inlet trough to cause grit to follow the ramp down towards the transition surface. A baffle is also positioned in the settling chamber against which the rotating liquid impinges to deflect the liquid downwardly into a generally toroidal flow pattern that spirals around the periphery of the settling chamber. The toroidal motion of the liquid moves the grit on the transition surface towards the center opening.

U.S. Pat. Nos. 4,767,532 and 7,971,732 also disclose vortex-type grit extractor apparatuses. U.S. Pat. No. 4,767,532, for example, discloses an apparatus for removing grit in which a grit storage chamber is provided beneath the center of the round chamber of the grit removal system. A removable plate substantially aligned with the floor of the round chamber generally separates the two chambers, with a central opening through the plate permitting communication between the chambers. A cylindrical shaft is rotatably supported on its upper end above the round chamber and extends down through the round chamber through the plate central opening. Liquid flow in the round chamber forces grit particles to settle toward the chamber floor, where they are urged radially inwardly so as to drop through the plate central opening into the grit storage chamber. A multi-bladed propeller is mounted on that shaft above the plate, and rotates with the shaft to assist in the liquid flow to move the grit toward the plate center opening. A pipe also extends down through the cylindrical shaft into the gift storage chamber, and a pump is provided on the upper end of the pipe to allow grit in the bottom of the storage chamber to be removed by pumping up through the pipe.

The above-described prior art devices operate on the forced vortex principle. In these devices the head at the periphery of the settling chamber is higher than at the center of the settling chamber. This causes liquid to flow down the wall of the settling chamber to the bottom thereof and across the bottom to the point of lower head at the center thereof. R is this transverse circulatory flow pattern which permits the device to work. The particulate matter in suspension must follow this path to reach the bottom of the settling chamber and be carried to the center of the transition surface to the storage chamber. This takes some time and some of the particulate matter may not travel the full circuit before it is caught in the flow passing out the effluent, which results in a lowering of grit removal efficiency.

In still other grit removal devices such as shown in U.S. Pat. Nos. 6,811,697, 8,906,233 and 9,932,731, flow toward the center of a chamber is facilitated by a rotating propeller or paddle. U.S. Pat. No. 8,906,233 also includes a ring around the interior periphery of the settling chamber blocking fluid flowing around the outside of the chamber from rising up to the level of the chamber outlet.

Grit removal devices as described above, whether operating by settling or vortex action, require a relatively large footprint, presenting space problems in designing overall treatment facilities in which the grit removal devices are only a part. Of course, larger devices are inherently more costly, and can use more energy. Further, such devices are not as well adapted as might be desired to operate efficiently in environments in which the flow rate varies widely. Still further, the ability of the devices to efficiently remove grit can always be improved.

The present invention is directed toward, inter alia, one or more of the problems set forth above.

SUMMARY OF THE INVENTION

In one aspect, a grit removal unit for a wastewater system for removing grit from a fluid includes a grit removal chamber cylindrical about a center vertical axis with a grit storage chamber disposed below the grit removal chamber, and at least one opening through the bottom of the grit removal chamber. At least one layer plate which is an inverted truncated cone around the center axis is spaced from the grit removal chamber vertical wall to allow fluid flow between the at least one layer plate and the grit removal chamber vertical wall. A plurality of concentric inverted truncated cone lamella plates are also in the grit removal chamber around the center axis and above the at least one layer plate, the lamella plates being radially spaced from one another relative to the center axis wherein the spacings between adjacent lamella plates define flow paths through which wastewater flows upwardly. An influent opening in the grit removal chamber vertical wall below the layered plates allows fluid and grit into the grit removal chamber, and an effluent opening in the grit removal chamber vertical wall above the lamella plates allows fluid to exit the grit removal chamber.

In one form, a center shaft is substantially coaxial with the center axis and rotatable around the central vertical axis, and blades projecting from and rotatable with the center shaft are disposed above the opening through the grit removal chamber bottom surface. In a further form, the blades are configured to direct flow of the fluid up around the center shaft and assist with forcing grit toward the grit storage chamber. In a further form, the grit removal chamber vertical wall is substantially annular about the center axis.

In another form, an enclosed influent channel is adapted to direct wastewater into the grit removal chamber beneath the layered plates. In a further form, the enclosed influent channel is adapted to direct wastewater into the grit removal chamber adjacent the grit removal chamber bottom surface and substantially tangential to the grit removal chamber vertical wall.

In still another form, the at least one layer plate is a substantially flatter truncated cone than the lamella plates.

In yet another form, the at least one layer plate has a center opening larger than the center shaft.

In another form, a FOG removal system is in the grit removal chamber above the lamella plates and beneath the effluent opening.

In a still further form, the at least one layer plate includes a first layer plate, and second and third layer plates vertically spaced from the first layer plate. The second layer plate is between the first and third layer plates and is substantially adjacent the grit removal chamber vertical wall to substantially block fluid flow between the second layer plate and the grit removal chamber wall. The third layer plate is spaced from the grit removal chamber vertical wall to allow fluid flow between the third layer plate and the grit removal chamber vertical wall.

In another aspect, a grit removal unit for removing grit from a fluid includes a grit removal chamber with a vertical wall which is annular about a central vertical axis, with a grit storage chamber disposed below the grit removal chamber, and at least one opening through the grit removal chamber bottom surface through which grit from the grit removal chamber may pass into the grit storage chamber. A center shaft is coaxial with, and rotatable around, the center axis. Blades project from, and rotate with, the center shaft, with the blades disposed above the grit storage chamber and configured to direct flow of fluid up around the center shaft. At least one layer plate is in the grit removal chamber in the shape of inverted truncated cones annular around the center axis. The at least one layer plate is spaced from the grit removal chamber annular vertical wall to allow fluid flow between it and the annular vertical wall. A plurality of concentric inverted truncated cone lamella plates are supported in the grit removal chamber around the center shaft and above the at least one layer plate. An influent opening in the grit removal chamber vertical wall below the layer plate allows the fluid and grit to enter the grit removal chamber through the influent opening. An effluent opening in the grit removal chamber vertical wall above the lamella plates allows fluid and grit to exit the grit removal chamber above the lamella plates.

In one form, an enclosed influent channel is adapted to direct wastewater into the grit removal chamber beneath the layered plates. In another form, the enclosed influent channel is adapted to direct wastewater into the grit removal chamber adjacent the grit removal chamber bottom surface and substantially tangential to a grit removal chamber substantially annular vertical wall.

In another form, an effluent channel is adapted to direct fluid from the grit removal chamber above the lamella plates.

In still another form, the at least one layer plate is a substantially flatter truncated cone than the lamella plates.

In yet another form, the at least one layer plate has a center opening larger than the center shaft.

In another form, a FOG removal system is in the grit removal chamber above the lamella plates and beneath the effluent opening.

In a still further form, there are at least three layer plates in the grit removal chamber, with the three layer plates being inverted truncated cones annular around the central vertical axis. The layer plates are vertically spaced from one another wherein a middle one of the three layer plates is substantially adjacent the grit removal chamber annular vertical wall to substantially block fluid flow between the middle layer plate and the annular vertical wall, and the layer plates above and below the middle layer plate are spaced from the grit removal chamber vertical wall to allow fluid flow between the grit removal chamber vertical wall and the layer plates above and below the middle layer plate.

In still another aspect, the grit removal unit includes an annular grit removal chamber with a bottom surface and a grit storage chamber disposed below the grit removal chamber and at least one opening through the bottom surface through which grit may pass into the grit storage chamber. A center shaft is rotatable around a vertical center axis and blades project from, and are rotatable with, the center shaft adjacent and above the bottom surface opening to direct flow of the fluid up around the center shaft. At least three layered plates which are inverted truncated cones annular around the center axis are vertically spaced from one another with a middle one of the three layered plates being substantially adjacent the grit removal chamber vertical wall to substantially block fluid flow between the middle layered plate and the annular vertical wall. The layered plates have center openings larger than the center shaft. A plurality of concentric inverted truncated cone lamella plates are in the grit removal chamber around the center shaft and above the layered plates. An enclosed influent channel is connected to an influent opening through the grit removal chamber annular vertical wall below the layered plates, whereby wastewater is directed into the grit removal chamber in a direction substantially tangential to the grit removal chamber vertical wall. An effluent channel is connected to an effluent opening in the grit removal chamber annular vertical wall above the lamella plates and allows fluid to exit. A FOG removal system is in the grit removal chamber above the lamella plates and beneath the effluent opening.

In one form, the wastewater flows through the layered plates in a substantially serpentine path.

In another form, the layered plates are substantially flatter truncated cones than the lamella plates.

Other objects, features, and advantages of the grit removal unit in its various forms will become apparent from a review of the entire specification, including the appended claims and drawings.

DETAILED DESCRIPTION

Figure 1:
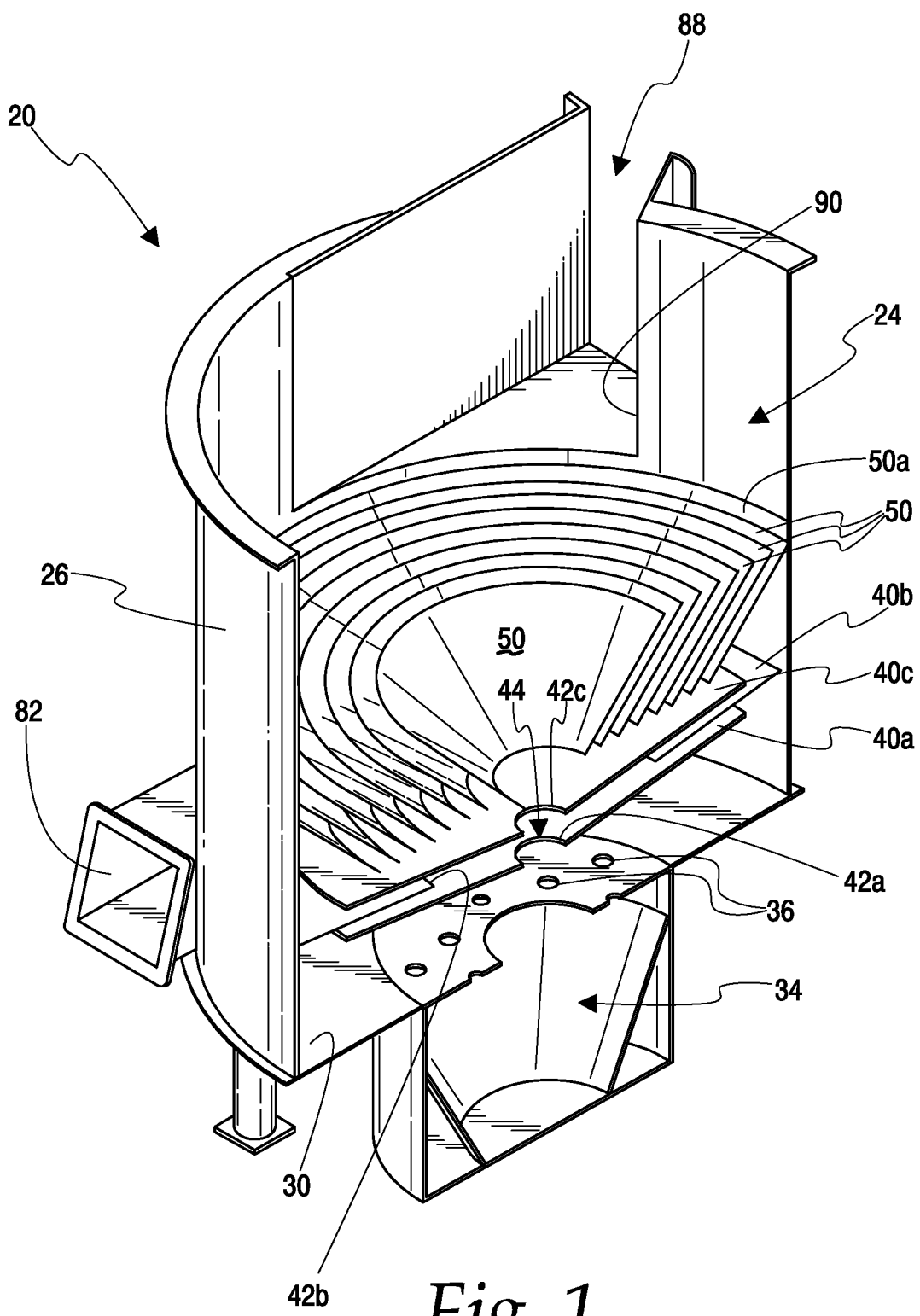
FIG. 1 is a perspective broken away view of the grit removal unit with certain details omitted (i.e., support brackets, the center shaft and items attached to the center shaft)
Figure 2:
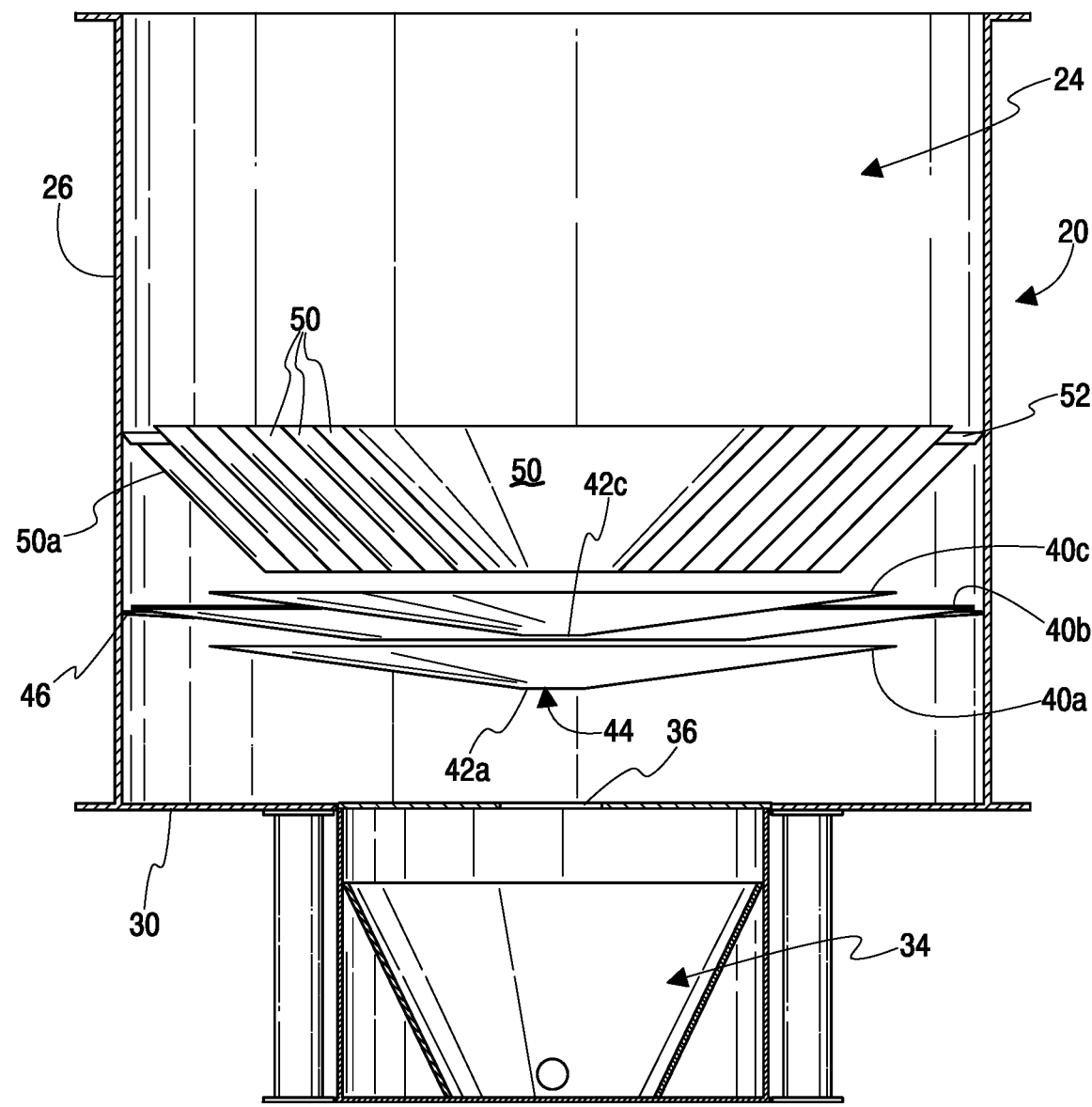
FIG. 2 is a vertical cross section through the grit removal unit with certain details omitted as in FIG. 1.
Figure 3:
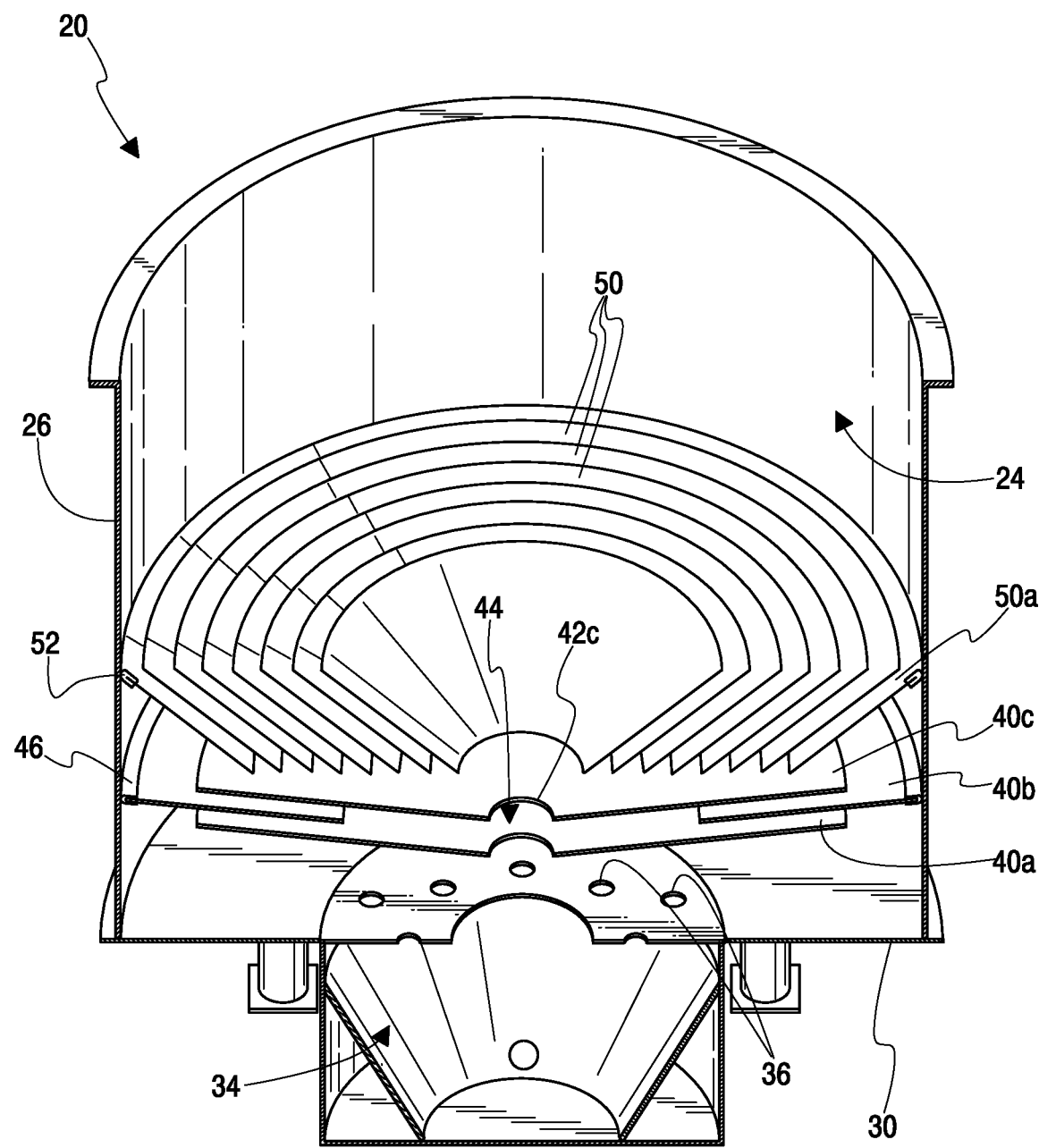
FIG. 3 is a perspective broken away view similar to FIG. 1, but as viewed in the opposite direction of FIG. 1.
Figure 4:
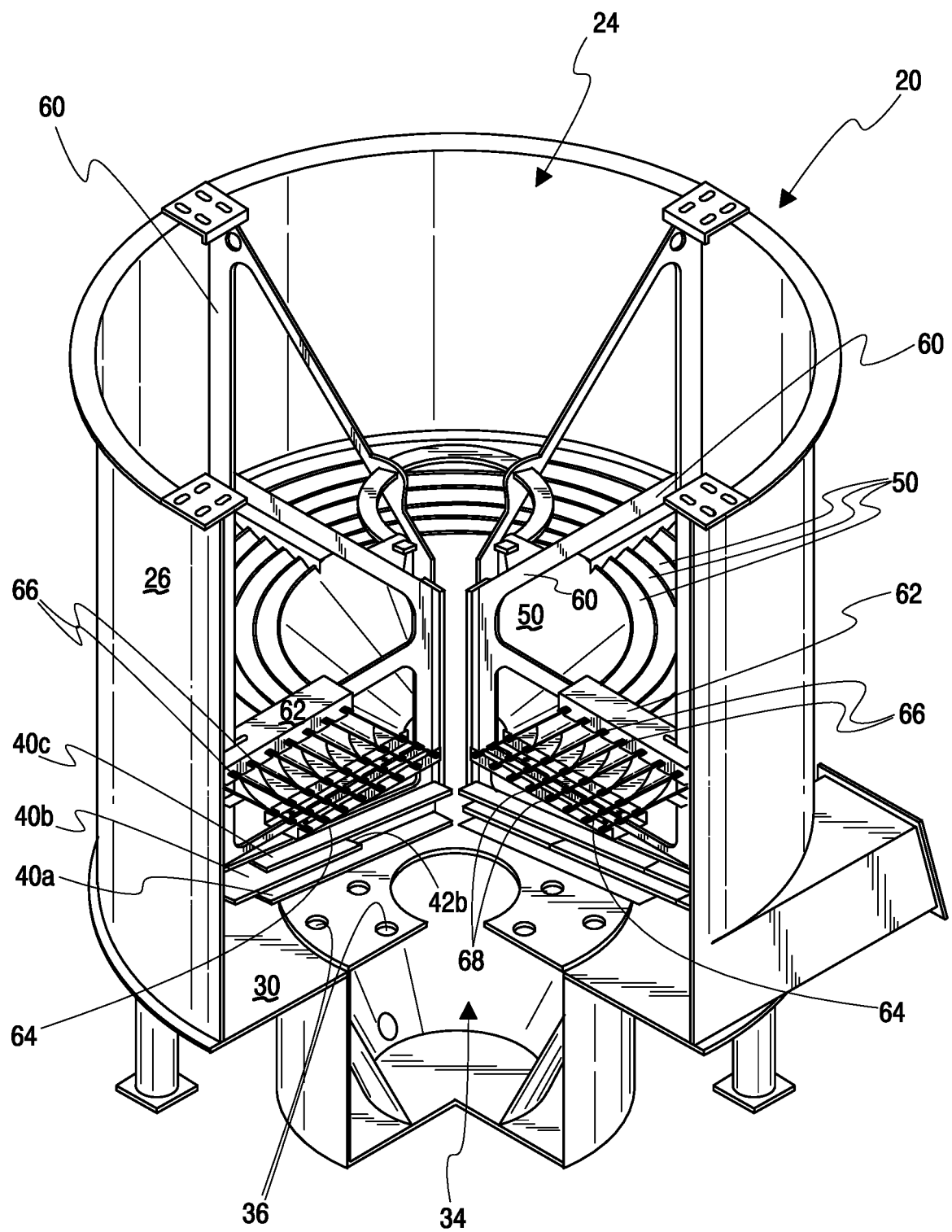
FIG. 4 is a perspective broken away view of the grit removal unit with a quarter broken away, wherein the center shaft and items attached to the center shaft are omitted.
Figure 5:
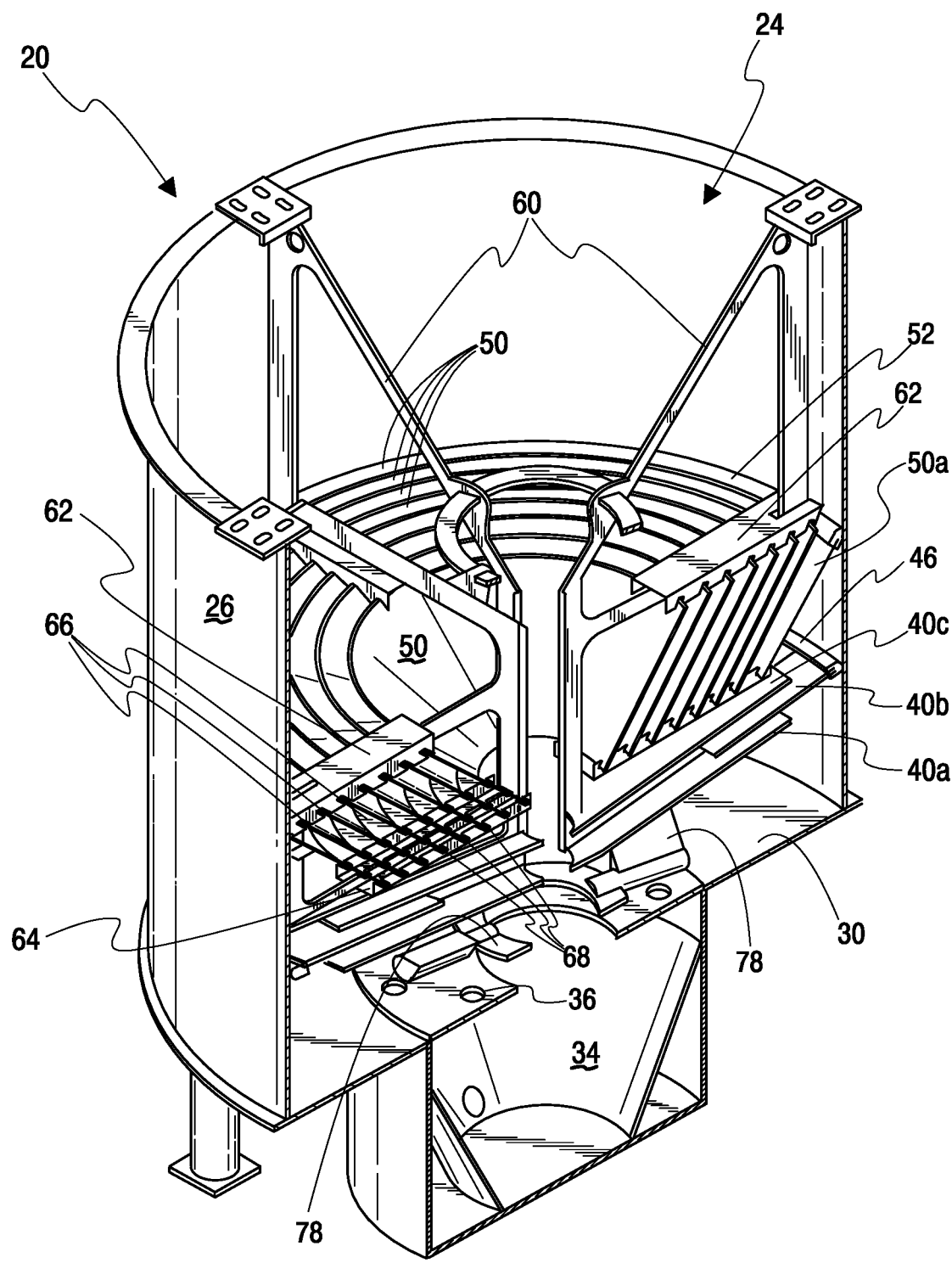
FIG. 5 is a perspective broken away view similar to FIG. 3, with support brackets, propeller blades and flow guides included and the center shaft omitted.
Figure 6:
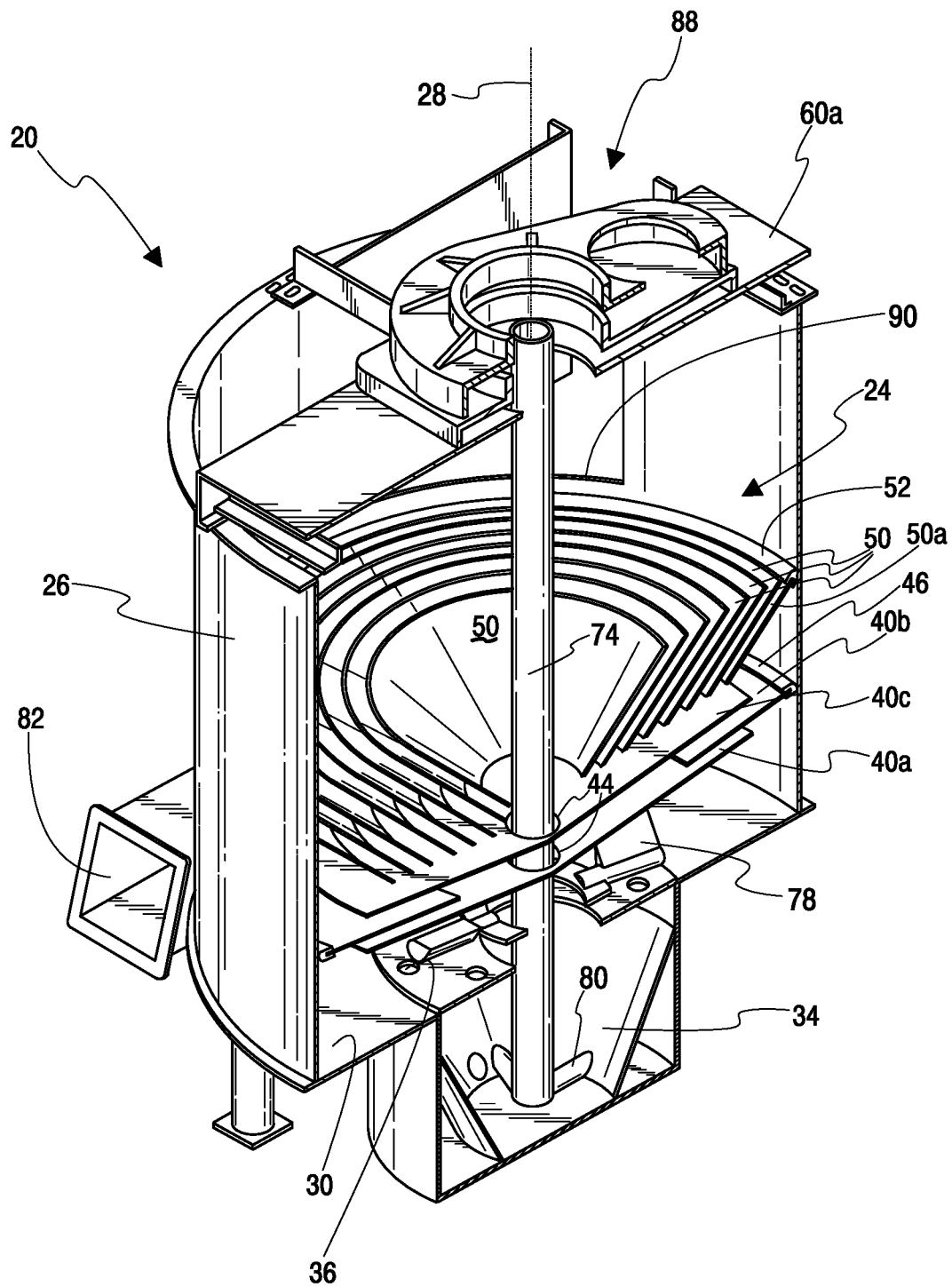
FIG. 6 is a perspective broken away view similar to FIG. 5, with support brackets of FIG. 5 omitted and the center shaft included.
Figure 7:
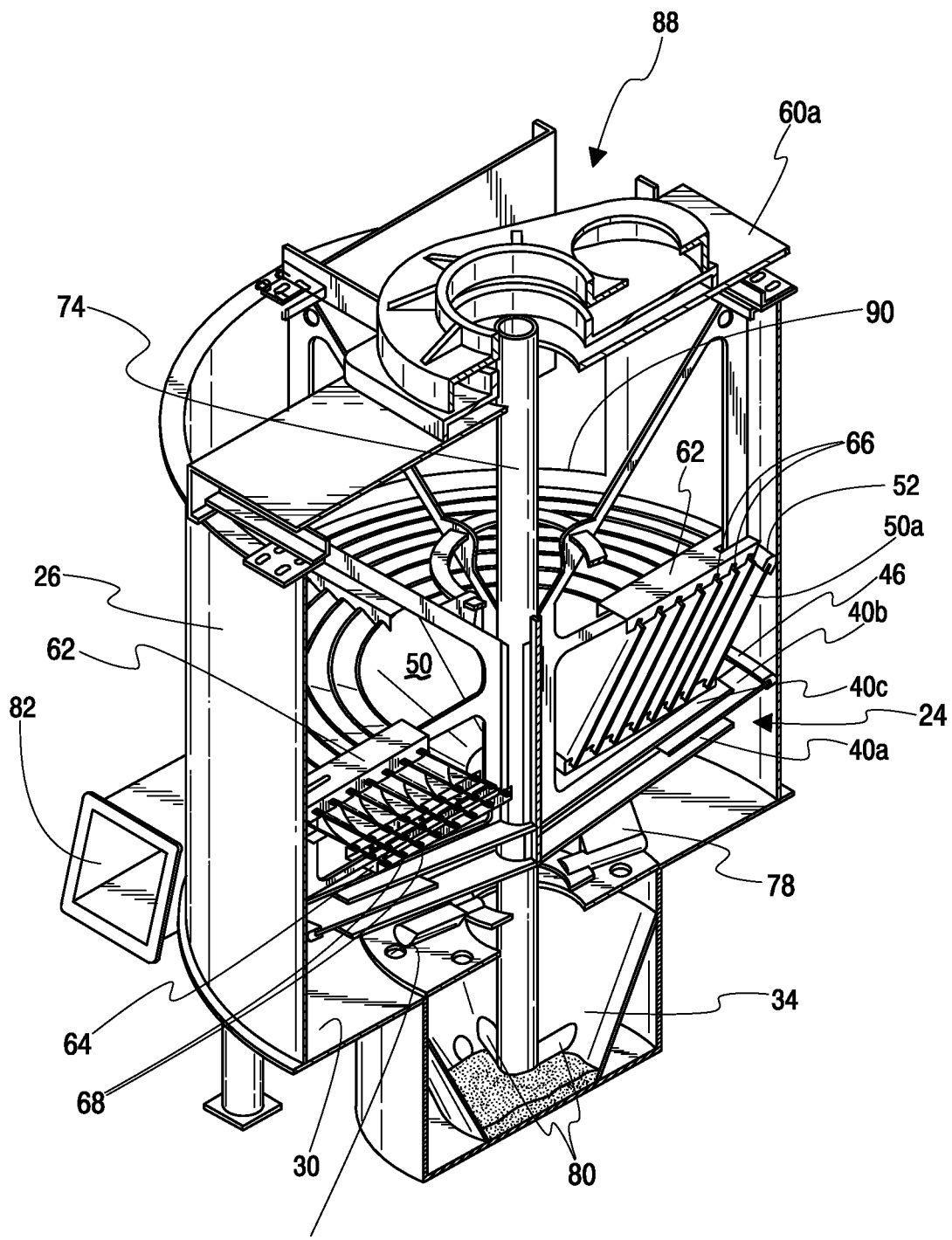
FIG. 7 is a perspective broken away view including the features included in FIGS. 5-6.
Figure 8:
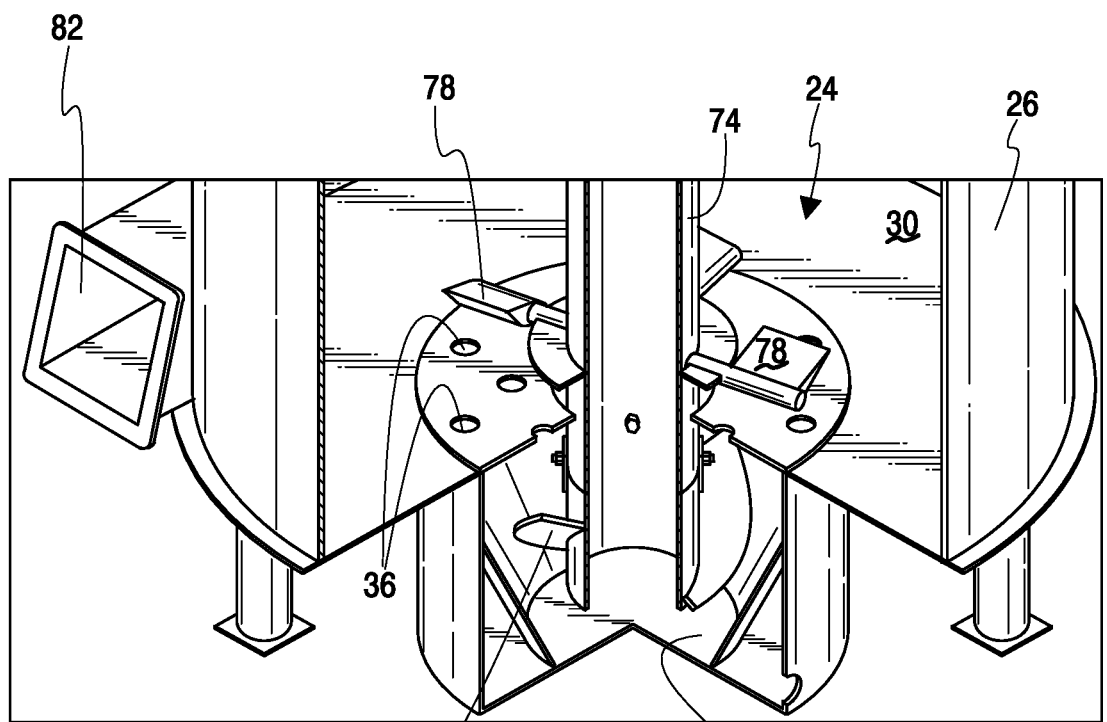
FIG. 8 is a perspective broken away view of the bottom of the grit removal unit.
Figure 9:
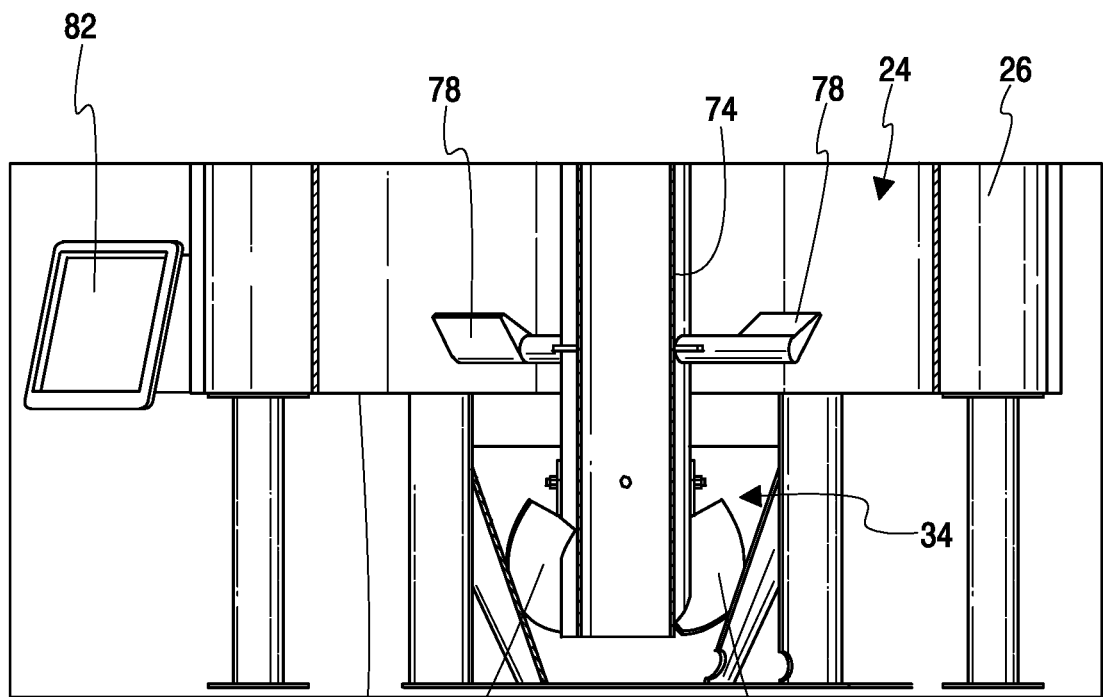
FIG. 9 is a vertical cross section through the bottom of the grit removal unit.
Figure 10:
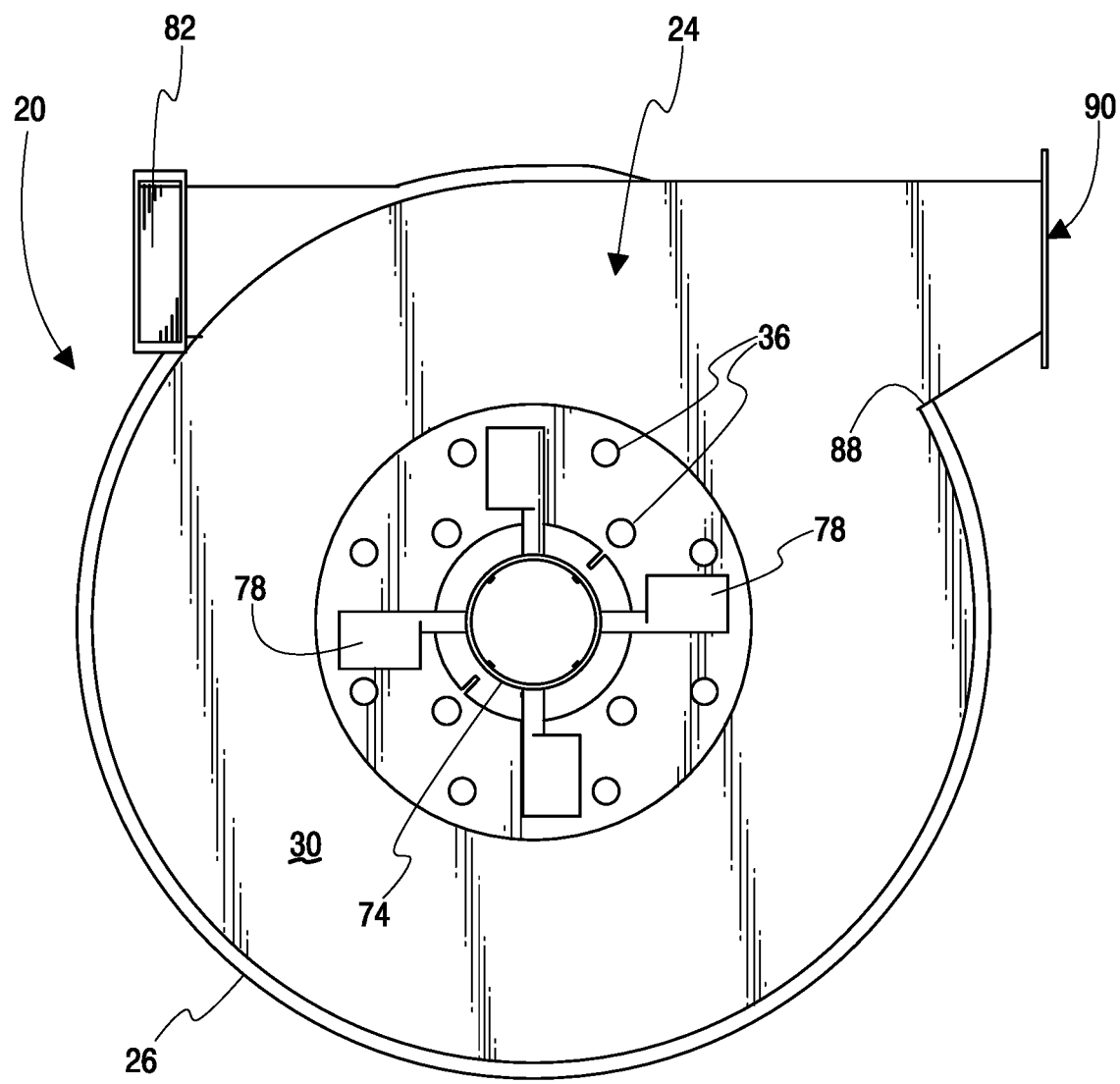
FIG. 10 is a top view of the grit removal unit with the support brackets, layered plates and lamella plates omitted.

A grit removal unit 20 is variously shown in FIGS. 1-10.

The grit removal unit 20 includes a grit removal chamber 24 including a vertical wall 26 which is substantially annular or cylindrical about a central axis 28 and extending upwardly from a bottom surface 30.

Beneath the bottom surface 30 is a hopper or grit storage chamber 34, where grit removed from fluid in the grit removal chamber 24 is directed and captured (collected) for periodic removal for dewatering and disposal. The grit removal chamber bottom surface 30 includes one or more openings 36 therethrough toward which wastewater (fluid with grit) is directed for passage down into the grit storage chamber 34.

Three layered plates 40a, 40b, 40c are in the grit removal chamber 24 spaced above the grit removal chamber bottom surface 30 (the multiple plates 40a, 40b, 40c are "layered" and referred to as such, but individual plates are also referred to herein as "layer" plates). The layered plates 40a-c are relatively flat inverted truncated cones—that is, they are annular around the central axis 28 with their wide end above the narrow end 42a-c, where the narrow ends 42a-c each have a central opening 44 therethrough.

The layered plates 40a-c are vertically spaced from one another, with the middle layered plate 40b extending outwardly to the grit storage chamber vertical wall 26 where a suitable seal or gasket 46 preventing wastewater from passing between the vertical wall 26 and the middle layered plate 40b may be advantageously provided. The gasket 46 also helps for proper fit if any components are out of tolerance The top and bottom layered plates 40a, 40c are, by contrast, spaced from the grit storage chamber vertical wall 26 and extend further toward the central axis 28 than the middle layered plate 40b so that, as described in greater detail hereafter in connection with FIG. 11, wastewater will flow up from the bottom of the grit removal chamber 24 and between the layered plates 40a-c in a serpentine manner.

While three layered plates 40a-c are disclosed herein, it should be understood that it would be within the scope of the advantageous structure disclosed herein to have more or less than three layered plates, including as few as one layer plate 40a. If only one layer plate 40a is provided, it should be spaced from the grit storage chamber vertical wall 26 so that wastewater will flow up from the bottom of the grit removal chamber 24 through the space between the one layer plate 40a and the grit storage chamber vertical wall 26.

Figure 11:
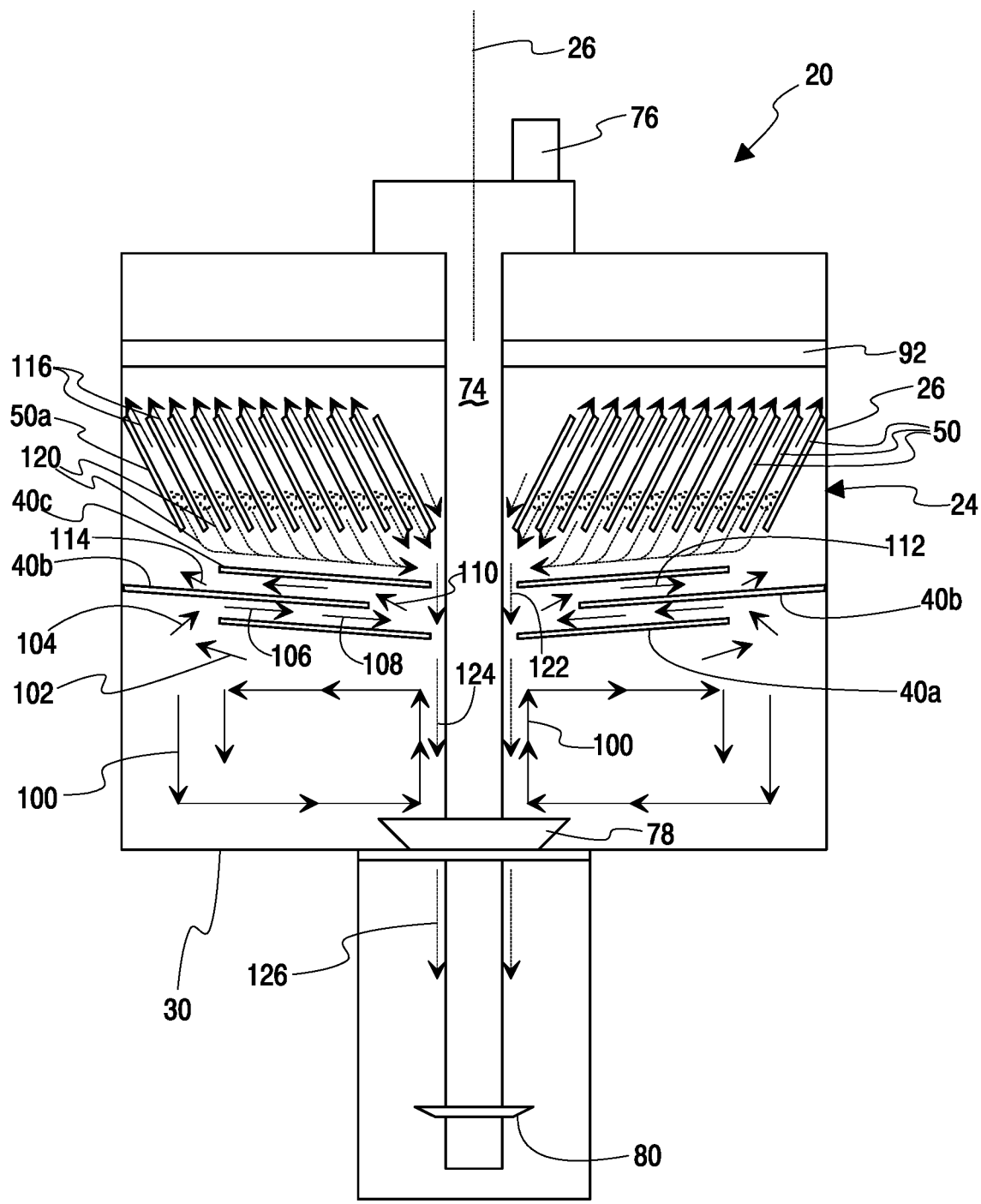
FIG. 11 is a schematic view of the grit removal unit illustrating the flow of wastewater including grit through the grit removal unit.

A plurality of concentric inverted truncated cone lamella-style (lamella) plates 50 are disposed above the layered plates 40a-c in the grit removal chamber 24 and centered around the central axis 28. (Eight lamella plates 50 are illustrated in the Figures, though more or less could be used depending on the design requirements—for example, FIG. 11 shows twelve lamella plates). The outermost lamella plate 50a, like the middle layered plate 40b, extends outwardly to the grit storage chamber vertical wall 28 with a suitable seal or gasket 52 preventing wastewater from passing between the vertical wall 26 and the outside of the outermost lamella plate 50a. It should be appreciated that the gaskets 46, 52 will avoid and/or correct for field construction mistakes which can result in improper diameters and/or concentricity of the grit removal chamber 24. That is, flexible/compressible gaskets 46, 52 allow elimination of gaps around the outside of the grit removal chamber 24 through which grit particles may short cut through the unit 20 and decrease grit particle capture efficiency.

The inclined configuration of the layered plates 40a-c and lamella plates 50a-h provide a self-cleaning mechanism which prevents excessive buildup of the solids and clogging.

As noted, the layered plates 40a-c and lamella plates 50 may advantageously be in the shape of inverted truncated cones, with the layered plates 40a-c substantially flatter cones than the lamella plates 50. However, it should be understood that the plates may in some forms have flat rather than curved sides, with pyramidal flat sides approximating a truncated cone, such as a four sided pyramid or octagonal pyramid. As used herein, such shapes are to be considered to be truncated cones.

A suitable bracket structure 60 may be secured to the grit removal chamber 24 (see FIGS. 4-7) for supporting the described plates 40a-c, 50 and other components. For example, circumferentially spaced radial supports 62, 64 are disposed at the top and bottom of the lamella plates 50 with slots 66, 68 therein receiving the top and bottom lips of the lamella plates 50 to thereby support the lamella plates 50 in concentric spaced locations.

The bracket structure 60a may further function to support a center shaft 74 which may be rotatably driven (see drive 76 in FIG. 11) about the center axis 28 to drive propeller blades 78 near the bottom surface 30 of the grit removal chamber 24 to direct the flow of wastewater and hydraulically forced grit toward the grit storage chamber 34 as desired and described in further detail hereafter, and drive fluidizing vanes 80 near the bottom surface of the grit storage chamber 34 to stir settled grit. A top bracket 60a across the top of the grit removal chamber 24 may similarly support a suitable drive to rotate the center shaft 74 as desired.

An enclosed influent channel 82 is connected to an influent opening through the grit removal chamber vertical wall 26 beneath the layered plates 40a-c and generally tangentially to the grit removal chamber annular vertical wall 26. Wastewater thus enters the grit removal chamber 24 at its outer perimeter where the vertical wall 26 directs the flow toward circling around the outer perimeter—that is, in a vortex movement.

An effluent channel 88 is connected to an effluent opening 90 in the grit removal chamber vertical wall 26 above the lamella plates 50. The input wastewater minus the removed grit passes out of the grit removal unit 20 to allow for further processing where necessary.

A fat, oil and grease ("FOG" as used herein) removal system 92 (see FIG. 11) with a skimmer arm may also be included above the lamella plates 50 and below the effluent channel 88. FOG particles flow with and float on the wastewater due to lower density. The FOG removal system 92 may include static and/or dynamic FOG capturing media allowing constant contact with the everchanging water height for continuous capturing of FOG particles. A skimmer arm may also be advantageously included to accumulate and drain a small depth of the water stream height to facilitate acquiring floating FOG particles. The FOG removal system 92 helps collect (capture) and remove (dispose of) any greases, oils and fats which might become nuisances in apparatuses such as may be downstream of the grit removal unit 20 which further treat the effluent from the grit removal unit 20. Thus, creation of odor emitting bacteria which can occur with coagulation and collection of FOG particles in no-flow areas of the equipment downstream from the grit removal unit 20 may be avoided.

Operation of the grit removal unit 20 may thus be best understood by reference to the schematic view of FIG. 11. As is known for vortex type grit removal units, wastewater flow in the grit removal chamber 24 enters tangentially to the annular vertical wall 26 and then swirls around the bottom of the grit removal chamber 24 to create a vortex in which grit falls down toward the bottom surface 30 and is drawn to the center where such grit may fall through the openings 36 and into the grit storage chamber 34.

In addition to the vortex movement of the fluid, the propeller blades 78 propel wastewater near the center of the grit removal chamber 24 up to also add a donut-like flow element such as shown by arrows 100. Along with the propeller blades 78 and vortex movement, such flow element also facilitates the settling or falling out of the grit particles as well as the movement of such particles toward the center where they may fall into the grit storage chamber 34.

As more wastewater enters the unit 20, flow additionally occurs up (see arrows 102 and 104) from the bottom portion of the grit removal chamber 24 and through the layered plates 40a-c in a serpentine manner (i.e., [i] around the outside of the bottom layered plate 40a, then [ii] radially inwardly between the bottom and middle layered plates 40a, 40b [arrows 106, 108], then [iii] up [arrows 110] through the gap between the middle layered plate 40b and center shaft 74, and then [iv] between the middle layered plate 40b and the top layered plate 40c [arrows 112].

It should be appreciated that during this flow through the layered plates 40a-c, some of the remaining grit particles will settle out due to the large effective settling area, which settled grit settles onto the bottom and middle layered plates 40a, 40b and then slides down the layered plates 40a, 40b and ultimately through the gap between the bottom and middle layered plates 40a, 40b and the center shaft 74.

Further, wastewater exiting from the channel between the middle layered plate 40b and top layered plate 40c (arrows 114) will continue to flow upwards, this time through the spaces between the lamella plates 50 (arrows 116). As with the flow through the layered plates 40a-c, grit particles still remaining in the wastewater passing through the lamella plates 50 will settle out due to the large effective settling area of the lamella plates 50, which settled grit will slide down the lamella plates 50 (dotted arrows 120) onto the top layered plate 40c, then sliding down the top layered plate 40c and ultimately through the gap between the layered plates 40a-c and the center shaft 74.

In short, flow of wastewater through the layered plates 40a-c and the lamella plates 50 will settle out remaining grit particles which will slide over the plates 40a-c, 50 to the center, and then down around the center shaft 74 (dotted arrows 122, 124) back into the bottom of the grit removal chamber 24 where the grit particles may also ultimately pass through the openings 36 into the grit storage chamber 34 (dotted arrows 126). Wastewater which has passed through the layered plates 40a-c and lamella plates 50 will exit the grit removal chamber through the effluent opening 90 into the effluent channel 88.

It should be appreciated that the grit removal unit 20 may in various forms as described herein facilitate efficient and reliable removal of grit from wastewater for advantageous use in a wide variety of wastewater treatment systems.

The invention claimed is:

1. A grit removal unit for a wastewater system for removing grit from a fluid, comprising:
   a grit removal chamber defined by a bottom surface and a vertical wall extending up from said bottom surface, said grit removal chamber having a substantially central vertical axis;
   a grit storage chamber disposed below said grit removal chamber, and at least one opening through said grit removal chamber bottom surface through which grit from said grit removal chamber may pass into said grit storage chamber;
   at least one layer plate in said grit removal chamber, said layer plate being an inverted truncated cone annular around said central vertical axis, said at least one layer plate being spaced from the grit removal chamber vertical wall to allow fluid flow between the at least one layer plate and the grit removal chamber vertical wall;
   a plurality of concentric inverted truncated cone lamella plates in said grit removal chamber around said central vertical axis and above said at least one layer plate, said lamella plates being radially spaced from one another relative to the central vertical axis wherein said spacings between adjacent lamella plates define flow paths through which wastewater flows upwardly;

an influent opening in said grit removal chamber vertical wall below said at least one layer plate wherein fluid and grit enters said grit removal chamber through said influent opening; and an effluent opening in said grit removal chamber vertical wall above said lamella plates wherein said fluid exits said grit removal chamber through said effluent opening.

2. The grit removal unit of claim 1, further comprising:
a center shaft substantially coaxial with said central vertical axis and rotatable around said central vertical axis;
blades projecting from and rotatable with said center shaft, said blades being disposed above said opening through said grit removal chamber bottom surface.

3. The grit removal unit of claim 2, wherein said blades are configured to direct flow of said fluid up around said center shaft and assist with forcing grit toward said grit storage chamber.

4. The grit removal unit of claim 2, wherein said grit removal chamber vertical wall is substantially annular about said central vertical axis.

5. The grit removal unit of claim 1, further comprising an enclosed influent channel adapted to direct wastewater into said grit removal chamber beneath said at least one layer plate.

6. The grit removal unit of claim 5, wherein said enclosed influent channel is adapted to direct wastewater into said grit removal chamber adjacent said grit removal chamber bottom surface and substantially tangential to said grit removal chamber substantially annular vertical wall.

7. The grit removal unit of claim 1, wherein said at least one layer plate is a substantially flatter truncated cone than said lamella plates.

8. The grit removal unit of claim 1, wherein said at least one layer plate has a center opening larger than said center shaft.

9. The grit removal unit of claim 1, further comprising a FOG removal system in said grit removal chamber above said lamella plates and beneath said effluent opening.

10. The grit removal unit of claim 1, wherein said at least one layer plate comprises a first layer plate, and second and third layer plates vertically spaced from said first layer plate with said second layer plate between said first and third layer plates, wherein
said second layer plate is substantially adjacent the grit removal chamber vertical wall to substantially block fluid flow between the second layer plate and the grit removal chamber wall, and
said third layer plate is spaced from the grit removal chamber vertical wall to allow fluid flow between the third layer plate and the grit removal chamber vertical wall.

11. A grit removal unit for a wastewater system for removing grit from a fluid, comprising:
a grit removal chamber defined by a bottom surface and a substantially annular vertical wall extending up from said bottom surface, said grit removal chamber being substantially round about a central vertical axis;
a grit storage chamber disposed below said grit removal chamber, and at least one opening through said grit removal chamber bottom surface through which grit from said grit removal chamber may pass into said grit storage chamber;
a center shaft substantially coaxial with said central vertical axis and rotatable around said central vertical axis;
blades projecting from and rotatable with said center shaft, said blades being disposed above said opening through said grit removal chamber bottom surface and configured to direct flow of said fluid up around said center shaft;
at least one layer plate in said grit removal chamber, said layer plate being an inverted truncated cone annular around said central vertical axis, said at least one layer plate being spaced from the grit removal chamber vertical wall to allow fluid flow between the at least one layer plate and the grit removal chamber vertical wall;
a plurality of concentric inverted truncated cone lamella plates in said grit removal chamber around said center shaft and above said at least one layer plate;
an influent opening in said grit removal chamber annular vertical wall below said at least one layer plate, said fluid and grit entering said grit removal chamber through said influent opening; and
an effluent opening in said grit removal chamber annular vertical wall above said lamella plates, said fluid and grit exiting said grit removal chamber through said effluent opening.

12. The grit removal unit of claim 11, further comprising an enclosed influent channel adapted to direct wastewater into said grit removal chamber beneath said at least one layer plate.

13. The grit removal unit of claim 12, wherein said enclosed influent channel is adapted to direct wastewater into said grit removal chamber adjacent said grit removal chamber bottom surface and substantially tangential to said grit removal chamber substantially annular vertical wall.

14. The grit removal unit of claim 11, further comprising an effluent channel adapted to direct fluid from said grit removal chamber above said lamella plates.

15. The grit removal unit of claim 11, wherein said at least one layer plate is a substantially flatter truncated cone than said lamella plates.

16. The grit removal unit of claim 11, wherein said at least one layer plate has a center opening larger than said center shaft.

17. The grit removal unit of claim 11, further comprising a FOG removal system in said grit removal chamber above said lamella plates and beneath said effluent opening.

18. The grit removal unit of claim 11, wherein there are at least three layer plates in said grit removal chamber, said layer plates being inverted truncated cones annular around said central vertical axis, said layer plates being vertically spaced from one another wherein
a middle one of the three layer plates is substantially adjacent the grit removal chamber annular vertical wall to substantially block fluid flow between the middle layer plate and the annular vertical wall, and
the layer plates above and below the middle layer plate are spaced from the grit removal chamber vertical wall to allow fluid flow between the grit removal chamber vertical wall and the layer plates above and below the middle layer plate.

19. A grit removal unit for a wastewater system for removing grit from a fluid, comprising:
a grit removal chamber defined by a bottom surface and a substantially annular vertical wall extending up from said bottom surface, said grit removal chamber being substantially round about a central vertical axis;
a grit storage chamber disposed below said grit removal chamber, and at least one opening through said grit removal chamber bottom surface through which grit from said grit removal chamber may pass into said grit storage chamber;
a center shaft substantially coaxial with said central vertical axis and rotatable around said central vertical axis;
blades projecting from and rotatable with said center shaft, said blades being disposed adjacent and above said opening through said grit removal chamber bottom surface and configured to direct flow of said fluid up around said center shaft;
at least three layer plates in said grit removal chamber, said layer plates
being inverted truncated cones annular around said central vertical axis,
being vertically spaced from one another with a middle one of the three layer plates being substantially adjacent the grit removal chamber annular vertical wall to substantially block fluid flow between the middle layer plate and the annular vertical wall, and
having center openings larger than said center shaft;
a plurality of concentric inverted truncated cone lamella plates in said grit removal chamber around said center shaft and above said layer plates;
an enclosed influent channel connected to an influent opening through said grit removal chamber annular vertical wall below said layer plates, whereby wastewater is directed into said grit removal chamber in a direction substantially tangential to said grit removal chamber annular vertical wall;
an effluent channel connected to an effluent opening in said grit removal chamber annular vertical wall above said lamella plates, said fluid exiting said grit removal chamber through said effluent opening; and
a FOG removal system in said grit removal chamber above said lamella plates and beneath said effluent opening.

20. The grit removal unit of claim 19, wherein said wastewater flows through said layer plates in a substantially serpentine path.

21. The grit removal unit of claim 19, wherein said layer plates are substantially flatter truncated cones than said lamella plates.

22. A grit removal unit for a wastewater system for removing grit from a fluid, comprising:
a grit removal chamber defined by a bottom surface and a vertical wall extending up from said bottom surface, said grit removal chamber having a substantially central vertical axis;
a grit storage chamber disposed below said grit removal chamber, and at least one opening through said grit removal chamber bottom surface through which grit from said grit removal chamber may pass into said grit storage chamber;
at least one layer plate in said grit removal chamber, said layer plate being an inverted truncated cone annular around said central vertical axis, said at least one layer plate being spaced from the grit removal chamber vertical wall to allow fluid flow between the at least one layer plate and the grit removal chamber vertical wall;
lamella settlers in said grit removal chamber around said central vertical axis and above said at least one layer plate;
an influent opening in said grit removal chamber vertical wall below said at least one layer plate wherein fluid and grit enters said grit removal chamber through said influent opening; and
an effluent opening in said grit removal chamber vertical wall above said lamella settlers wherein said fluid exits said grit removal chamber through said effluent opening.

23. The grit removal unit of claim 22, wherein said lamella settlers comprise a plurality of concentric inverted truncated cone lamella plates in said grit removal chamber around said central vertical axis and above said at least one layer plate, said lamella plates being radially spaced from one another relative to the central vertical axis wherein said spacings between adjacent lamella plates define flow paths through which wastewater flows upwardly.

24. The grit removal unit of claim 22, further comprising:
a center shaft substantially coaxial with said central vertical axis and rotatable around said central vertical axis;
blades projecting from and rotatable with said center shaft, said blades being disposed above said opening through said grit removal chamber bottom surface.

25. The grit removal unit of claim 24, wherein said blades are configured to direct flow of said fluid up around said center shaft and assist with forcing grit toward said grit storage chamber.

26. The grit removal unit of claim 22, wherein said grit removal chamber vertical wall is substantially annular about said central vertical axis.

27. The grit removal unit of claim 22, further comprising an enclosed influent channel adapted to direct wastewater into said grit removal chamber beneath said at least one layer plate.

28. The grit removal unit of claim 27, wherein said enclosed influent channel is adapted to direct wastewater into said grit removal chamber adjacent said grit removal chamber bottom surface and substantially tangential to said grit removal chamber substantially annular vertical wall.

29. The grit removal unit of claim 22, wherein said at least one layer plate has a center opening larger than said center shaft.

30. The grit removal unit of claim 22, further comprising a FOG removal system in said grit removal chamber above said lamella settlers and beneath said effluent opening.

31. The grit removal unit of claim 22, wherein said at least one layer plate comprises a first layer plate, and second and third layer plates vertically spaced from said first layer plate with said second layer plate between said first and third layer plates, wherein
said second layer plate is substantially adjacent the grit removal chamber vertical wall to substantially block fluid flow between the second layer plate and the grit removal chamber wall, and
said third layer plate is spaced from the grit removal chamber vertical wall to allow fluid flow between the third layer plate and the grit removal chamber vertical wall.

32. A grit removal unit for a wastewater system for removing grit from a fluid, comprising:
a grit removal chamber defined by a bottom surface and a substantially annular vertical wall extending up from said bottom surface, said grit removal chamber being substantially round about a central vertical axis;
a grit storage chamber disposed below said grit removal chamber, and at least one opening through said grit removal chamber bottom surface through which grit from said grit removal chamber may pass into said grit storage chamber;

a center shaft substantially coaxial with said central vertical axis and rotatable around said central vertical axis;

blades projecting from and rotatable with said center shaft, said blades being disposed above said opening through said grit removal chamber bottom surface and configured to direct flow of said fluid up around said center shaft;

at least one layer plate in said grit removal chamber, said layer plate being an inverted truncated cone annular around said central vertical axis, said at least one layer plate being spaced from the grit removal chamber vertical wall to allow fluid flow between the at least one layer plate and the grit removal chamber vertical wall;

a plurality of lamella settlers in said grit removal chamber around said center shaft and above said at least one layer plate;

an influent opening in said grit removal chamber annular vertical wall below said at least one layer plate, said fluid and grit entering said grit removal chamber through said influent opening; and an effluent opening in said grit removal chamber annular vertical wall above said lamella settlers, said fluid and grit exiting said grit removal chamber through said effluent opening.

33. The grit removal unit of claim 32, further comprising an effluent channel adapted to direct fluid from said grit removal chamber above said lamella settlers.

34. The grit removal unit of claim 32, wherein said at least one layer plate has a center opening larger than said center shaft.

35. The grit removal unit of claim 32, further comprising a FOG removal system in said grit removal chamber above said lamella settlers and beneath said effluent opening.

36. The grit removal unit of claim 32, wherein there are at least three layer plates in said grit removal chamber, said layer plates being inverted truncated cones annular around said central vertical axis, said layer plates being vertically spaced from one another wherein a middle one of the three layer plates is substantially adjacent the grit removal chamber annular vertical wall to substantially block fluid flow between the middle layer plate and the annular vertical wall, and the layer plates above and below the middle layer plate are spaced from the grit removal chamber vertical wall to allow fluid flow between the grit removal chamber vertical wall and the layer plates above and below the middle layer plate.

37. A grit removal unit for a wastewater system for removing grit from a fluid, comprising:

a grit removal chamber defined by a bottom surface and a substantially annular vertical wall extending up from said bottom surface, said grit removal chamber being substantially round about a central vertical axis;

a grit storage chamber disposed below said grit removal chamber, and at least one opening through said grit removal chamber bottom surface through which grit from said grit removal chamber may pass into said grit storage chamber;

a center shaft substantially coaxial with said central vertical axis and rotatable around said central vertical axis;

blades projecting from and rotatable with said center shaft, said blades being disposed adjacent and above said opening through said grit removal chamber bottom surface and configured to direct flow of said fluid up around said center shaft;

at least three layer plates in said grit removal chamber, said layer plates
being inverted truncated cones annular around said central vertical axis,
being vertically spaced from one another with a middle one of the three layer plates being substantially adjacent the grit removal chamber annular vertical wall to substantially block fluid flow between the middle layer plate and the annular vertical wall, and
having center openings larger than said center shaft;

a plurality of lamella settlers in said grit removal chamber around said center shaft and above said layer plates;

an enclosed influent channel connected to an influent opening through said grit removal chamber annular vertical wall below said layer plates, whereby wastewater is directed into said grit removal chamber in a direction substantially tangential to said grit removal chamber annular vertical wall;

an effluent channel connected to an effluent opening in said grit removal chamber annular vertical wall above said lamella settlers, said fluid exiting said grit removal chamber through said effluent opening; and a FOG removal system in said grit removal chamber above said lamella settlers and beneath said effluent opening.

38. The grit removal unit of claim 37, wherein said wastewater flows through said layer plates in a substantially serpentine path.

* * * * *